Patented Nov. 19, 1935

2,021,450

UNITED STATES PATENT OFFICE 2,021,450

SOLIDIFIED HONEY AND MANUFACTURE THEREOF

Victor J. Hampton, Guelph, Ontario, Canada

No Drawing. Application November 21, 1932, Serial No. 643,735

2 Claims. (Cl. 99—11)

This invention relates to a solidified honey and the manufacture thereof, and its principal objects are:

First. To so prepare or process ordinary extracted honey that it forms a hard, solid, non-sticky mass at ordinary temperatures, thus rendering the honey convenient for many uses.

Second. To add no extraneous substance whatsoever to the honey at any stage in the practice of the process.

Third. To obtain a product which shall vary in color only slightly, if at all, from the natural honey.

Fourth. To produce an article of food in which are retained all the nutritive and enjoyable, as well as medicinal, properties of honey.

Natural honey may be described as a sweet, thick, sticky fluid collected by bees from the flowers of plants, and deposited in cells of a comb in hives; in other words, it is entirely the product of bees operating on the nectar of flowers and other saccharine exudations of plants.

When pure, honey varies in color from a yellowish white to light brown, with an agreeable odor. The nature of the flowers from which the honey is gathered, determines its color.

The natural honey usually contains not more than 25 per cent water, not more than eight per cent sucrose, and not less than sixty per cent invert sugar in the form of dextrose and levulose, together with not more than 25/100 of one per cent ash.

The composition of an average honey, according to what is known as "Browne's analysis" is as follows:

| H₂O | Levulose | Dextrose | Sucrose | Dextrin | Mineral matter | Undetermined |
|---|---|---|---|---|---|---|
| 17.7 | 40.5 | 34.02 | 1.9 | 1.5 | 0.18 | 5.0 | the figures indicating percentages.

It is well known that if honey is heated above a certain well defined temperature for any considerable length of time, many of its constituents are broken down. The sugars caramelize, producing a dark color and having a characteristic burnt taste. The aromatic oils or esters are volatilized or decomposed and the honey loses its original flavor and color. The decomposition products that are thus formed, alter the entire composition of the honey.

The fundamental purpose of this invention is to produce a pure product, which at ordinary temperatures is a hard, glassy solid, and which has not been overheated in the processing. At the same time, this hard, solid honey contains the original sugars in a chemically unaltered form, and has little appreciable discoloration. It contains less than two per cent water, and no extraneous substance except pure flavoring materials or coloring matter if such are desired.

The merit of honey as a food depends essentially upon the contained sugars, the mineral matter and the flavor.

The solidified honey described here, is obtained by subjecting natural honey to an evaporating process whereby the water contained in the honey, is extracted at a temperature below the decomposition points of the boiled sugars, and at a temperature below that which will cause the volatilization of the essential oils or the constituents which give honey its distinctive flavor.

This process of evaporation may be carried out in any suitable container in which the honey can be boiled under reduced pressure. The best container for this purpose is a vacuum pan in which the honey may be heated indirectly by steam or hot water, through coils or jackets, and in which there is provision for mechanical agitation of the honey by means of stirrers or paddles.

The material or materials of which the receptacle is made, must be such as do not react chemically with the honey or in any way discolor it. Copper, aluminum, Monel metal and other alloys are suitable for this purpose.

The preferred manner of treating the honey by means of my improved process, consists in cooking the same at a temperature of substantially 70 degrees C. under a pressure corresponding to a partial vacuum measured by 23 inches of mercury, and continuing the cooking for a period of substantially one hour and three-quarters. However, the temperature, the pressure, and the length of time of cooking, may be varied quite considerably from the figures just given, but must always be so coordinated relatively to one another that the proper results are obtained. Therefore, I do not limit myself precisely to these figures.

It is to be observed that the temperature and pressure must be so limited as not to break down or caramelize the sugars in the honey, and preferably, so as not to cause the volatilization of the essential oils which give to honey its flavor. This means that the pressure should not be more than is indicated by 18 inches mercury, and that the temperature of cooking should not be above 80 degrees C.

It is necessary to stir the honey during the evaporation process so as to speed up the operation and to prevent overheating near the sides of the evaporator. Due to the extreme viscous nature of the honey when practically all the water has been evaporated, the stirrers must be of rugged construction.

The final product from the evaporation of the honey under the conditions outlined above, is a viscous syrup which solidifies into a hard glassy substance upon cooling. The solidified product breaks with an uneven fracture, and with regard to the passage of light therethrough, varies from being translucent to being transparent, depending upon the color of the original honey and upon the care taken to prevent caramelization of the sugars. The whitest honeys may give some coloration to the final product due to the concentration into a smaller volume.

The percentage of invert sugars in the product will be between 80 and 90, depending upon the amounts of these sugars in the original honey. The amount of water in the final product will be less than two per cent by weight.

While the evaporated honey is still warm, it may be worked into any desired shape and may be handled the same as ordinary hard candy in the making. Coloring and flavoring materials may be added, as in the manufacture of hard candies from sugar. In case no other flavor than that of the honey is desired, this may be retained as explained above.

Due to the hygroscopic nature of the levulose in the solidified honey, it is desirable that, after leaving the partial vacuum, the cooked mass be worked in an atmosphere of low relative humidity, since otherwise, it may have a tendency to become sticky due to absorbed moisture. Any degree of relative humidity below forty-five per cent. will suffice to prevent absorption of moisture. As a precaution against absorbing moisture, it is advantageous to wrap the finished product, usually in the form of lozenges or the like, in moisture-proof material such as cellophane.

I am aware that honey has been extensively used in ordinary candy-making, but for this purpose it has always been mixed with sugars of various kinds, as well as glucose and the like. In such mixtures however, the characteristics of the solidified honey obtained by the present process are not maintained.

Furthermore, dehydrated food products are common, but to my knowledge, dehydrated honey in the form described herein, has not been produced before the teaching supplied through my invention. I have found too, that chemists and experienced candy-makers have heretofore maintained the conviction that pure honey without any extraneous substance, could not be transformed into a solid which is hard and glassy, and non-sticky at ordinary temperatures.

Having fully described my invention, what I claim is:

1. A process of transforming natural honey into a hard, glassy solid, consisting in subjecting the natural honey to a partial vacuum, simultaneously heating the same to a temperature less than 85 degrees C., and allowing the resulting viscous mixture to solidify in an atmosphere whose relative humidity is forty-five per cent or below.

2. The product, consisting of substantially pure honey in the form of a hard, glassy solid at ordinary temperatures, said product retaining substantially the color, odor and flavor of the original honey, producing an irregular fracture when broken, and containing less than two per cent by weight of moisture.

VICTOR J. HAMPTON.